(12) United States Patent
Cannon et al.

(10) Patent No.: US 6,229,889 B1
(45) Date of Patent: May 8, 2001

(54) ROBUST SIGNALING TONE FREQUENCY MEASUREMENT

(75) Inventors: Joseph M. Cannon, Harleysville; James A. Johanson, Macungie; Paul J. Davis, Wayne, all of PA (US)

(73) Assignee: Agere Systems Guardian Corp., Miami Lakes, FL (US)

( * ) Notice: Subject to any disclaimer, the term of this patent is extended or adjusted under 35 U.S.C. 154(b) by 0 days.

(21) Appl. No.: 09/285,670

(22) Filed: Apr. 5, 1999

(51) Int. Cl.$^7$ ...................................................... H04M 3/00
(52) U.S. Cl. .......................... 379/386; 379/386; 379/282; 379/283; 379/58-63; 379/351; 375/328; 375/329; 375/330; 375/331; 455/33.2; 455/54.1
(58) Field of Search .......................... 379/58, 59, 60–63, 379/282, 283, 351, 386; 375/328, 329, 330, 331; 367/199; 340/825.48, 825.71; 455/33.2, 54.1; 395/2.85, 2.14; 324/76.39, 76.57

(56) References Cited

U.S. PATENT DOCUMENTS 5,615,302 * 3/1997 McEachern .......................... 395/2.18
5,694,466 * 12/1997 Xie et al. ............................. 379/386

* cited by examiner

*Primary Examiner*—Forester W. Isen
*Assistant Examiner*—Ramnandan Singh
(74) *Attorney, Agent, or Firm*—William H. Bollman

(57) ABSTRACT

Apparatus and methods for adaptively, reliably, and accurately measuring the frequency of an alerting or other signaling tone. A tone detector measures the frequency of a tone (continuous or pulsed) with a high degree of accuracy (e.g., to within 1 part in 10,000). Two lower order or smaller DFTs measure the energy level in two separate but intersecting frequency ranges. A simple ratio is determined from the relative energy measured from discrete Fourier transforms relating to each of the two separate frequency ranges, and an actual measured frequency is determined.

9 Claims, 4 Drawing Sheets

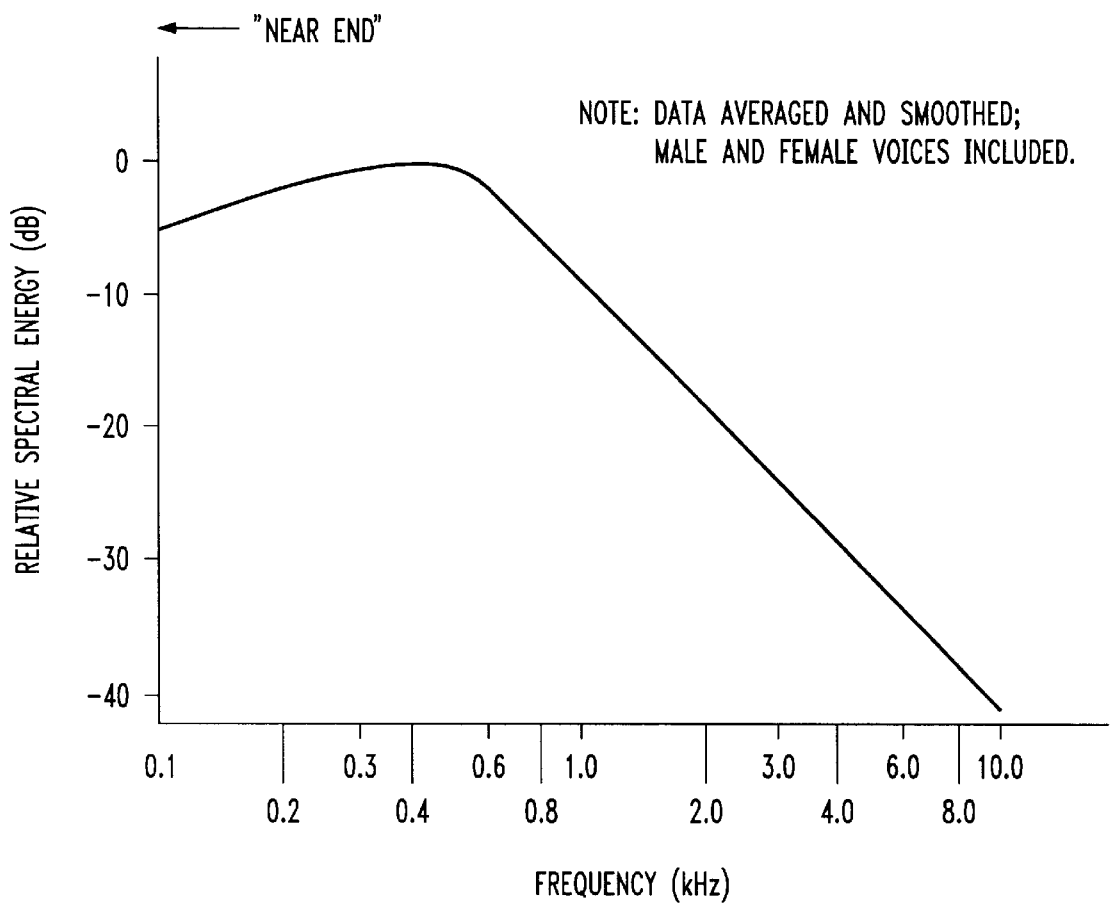

ROBUST SIGNALING TONE FREQUENCY MEASUREMENT

BACKGROUND OF THE INVENTION

1. Field of the Invention

This invention relates generally to the measurement of alerting or other signaling tones. More particularly, it relates to a versatile method and apparatus capable of accurately measuring a frequency of an alerting or other tone even in an environment including speech signals.

2. Background of Related Art

While the present invention relates to tone detection in general, it and its background are described with respect to a particular embodiment useful for detecting alerting tones relating to the reception of call related information, e.g., Caller ID information.

As is well known, Caller ID services permit a telephone customer to learn the identity of, or at least the originating telephone number of, a party seeking to place a telephone call to the customer. An older service referred to as Call-Waiting (CW) alerts a customer engaged in a telephone connection to another party, that a third party desires to place a telephone call to the customer. A newer service offered in telephone systems combines caller identification and call-waiting services, to not only alert a customer during a telephone connection that a third party desires to establish a connection, but also transmits to the CPE, caller identification information identifying the telephone number and/or name of the third party. This latter service is sometimes referred to as CIDCW (caller ID and call waiting) or Caller ID Type II.

Participation in a system with Caller ID and Call Waiting requires not only the presence of a central office capable of providing such service, but also CPE capable of receiving and transmitting the necessary control, acknowledgment and data signals. The general sequence of events during a telephone call in which the customer has Caller ID and Call Waiting service is as follows.

When a customer is currently engaged in a telephone conversation with a second party, a third party desiring to complete a telephone call with the customer may dial the customer's number. During the customer's conversation with the second party, the central office sends a subscriber alerting signal (SAS) alerting the customer that a third party desires to make a connection with the customer. The subscriber alerting signal is typically a single tone 400-hertz signal of about 500 milliseconds in duration, that is audible to the customer.

The central office follows the transmission of the subscriber alerting signal with the transmission of a CPE alerting signal (CAS). Similar to a dual tone multi-frequency signal, the CPE alerting signal has 2130 hertz and 2750 hertz components and optimally lasts for 80 milliseconds. Upon detection of the CPE alerting signal, the CPE sends a CAS acknowledgment signal (CAS ACK) to the central office, signaling to the central office that the CPE is ready to receive Caller ID information regarding the third party.

At the time the CPE transmits the CAS acknowledgment signal, it also disables the voice transmission transducer in the CPE. While the central office maintains the connection with the second party, it suppresses the CAS acknowledgment signal from the transmission sent to the second party. When the central office receives the CAS acknowledgment signal, it sends the caller identification information to the customer in the form of a frequency shift keyed (FSK) signal. The CPE can then display the caller identification information on a display unit as is known in the art. Full communication is established with the second party after receipt of the caller identification information. The customer, through the CPE can then decide how to handle the third party, such as placing the second party on hold and establishing the connection with the third party, for example.

Because of the proximity of the CPE alerting signal to voice frequencies transmitted and received in typical telephone systems, reliable detection of the CPE alerting signal can sometimes be a problem in conventional CPEs. For instance, conventional tone detectors used in this capacity sometimes experience "talkoff" episodes in which CPE alerting signals are falsely detected, and "talkdown" episodes in which actual CPE alerting signals are missed due to interference with speech. This erroneous operation is often the result of harmonic components of speech signals occurring in the frequency ranges of a tone signal such as the standard CPE alerting signal.

Many people have made telephone calls, enjoying the convenience of communications using a telephone or other customer premises equipment. Moreover, everyone has heard some type of alerting tone, call progress tone (CPT) or other signaling tone from a central office, be it a busy tone, a dial tone, or other single or dual frequency tone used to signal customer premises equipment or a central office over a telephone line.

Generally, alerting or other signaling tones are either continuous, periodic, intermittent, or single pulse only. The duration of any particular tone pulse may be very short, e.g., 40 milliseconds (mS) or less. Generally, a minimum length of a particular tone pulse is conventionally established to provide a conventional tone detection algorithm sufficient time to detect the presence of the tone.

FIG. 4 shows a conventional tone detector 902 adapted to detect the presence of a particular tone (i.e., a particular alerting or other signaling tone) in an input signal typically received over a telephone line, and output either a "tone detected" or a "tone not detected" signal. Many tone detectors contain a plurality of algorithms or parameters to accommodate the detection of a plurality of expected alerting tone or other tone signals. Some signaling tones require detection of more than one frequency component, e.g., Dual Tone Multiple Frequency (DTMF) signals.

Tone detectors (e.g., DTMF dialer and call progress tone detectors) are common in most customer premises equipment. Early customer premises equipment included analog filters for detecting a tone, but more recent customer premises equipment includes a processor with digital tone detection software. Digital tone detectors usually include an algorithm implementing a discrete Fourier transform (DFT).

A DFT processes digital samples of the input signal on a frame-by-frame basis. The DFT processes each sample frame to detect the presence of a particular frequency component in the input signal. If a particular frequency component above a predetermined energy threshold is detected in the processed frame, then a "tone detected" or similar signal is output.

Most conventional tone detectors detect the presence of tones when there is no speech on the telephone line, and thus most tone detectors need not be too robust to provide reliable results. Thus, short tones (i.e., tones having a minimum duration of, e.g., 40 mS) can be used for signaling. Moreover, in such systems, tone frequencies were sufficiently separated from each other to allow large tolerances in the detection and measurement of a tone in the input signal. More recently, it has become necessary to detect alerting and/or other tones in the presence of voice signals on a telephone line, and to measure their frequency with a high degree of accuracy.

FIG. 5 shows the approximate long-term average spectral energy density for continuous speech, showing that high relative spectral energy is present in near-end speech, which is in the same general range as many signaling tones used by central offices. Thus, the presence of speech together with an alerting or other tone may cause noise in the particular spectral regions being measured for the presence of a particular alerting or other signaling tone.

For instance, Call Subscriber Services such as Caller ID/Call Waiting (CIDCW) have become popular. Caller ID/Call Waiting is a Type II Caller ID service allowing the transmission of call related information such as a telephone number and/or household or business name to a called party regarding a third party caller to an established telephone call between the called party and someone else. Robust tone detectors are necessary to avoid the possibility of errors such as talkoff (false tone detects) and/or talkdowns (missed tone detects).

There is an increased need to accurately measure the frequency of a particular alerting or other signaling tone to increase robustness. Conventional alerting or other tones typically have a frequency offset or tolerance on the order of 2–3%. However, with the increase in Call Subscriber Services such as CIDCW and ADSL, there has become a need for more accurate frequency measurement and thus robust tone detectors, e.g., on the order of, e.g., 0.5–1% or less.

There is thus a need for a method and apparatus capable of more accurately measuring a frequency of an alerting or other signaling tone, even in the presence of speech or other distracting and/or distorting signals.

SUMMARY OF THE INVENTION

In accordance with the principles of the present invention, apparatus for measuring a frequency of a tone comprises an upper tolerance discrete Fourier transform having an upper center frequency above a frequency of interest. A lower tolerance discrete Fourier transform has a lower center frequency below the frequency of interest. A ratio determination module determines a ratio between a first measured energy level output from the upper tolerance discrete Fourier transform and a second measured energy level output from the lower tolerance discrete Fourier transform.

A method of interpolating an actual frequency of a detected signaling tone in accordance with another aspect of the present invention comprises determining a ratio between a first measured energy level output from an upper tolerance discrete Fourier transform having an upper center frequency, and a second measured energy level output from a lower tolerance discrete Fourier transform having a lower center frequency lower than the upper center frequency. The actual frequency is interpolated using the upper center frequency, the lower center frequency, and the determined ratio.

BRIEF DESCRIPTION OF THE DRAWINGS

Features and advantages of the present invention will become apparent to those skilled in the art from the following description with reference to the drawings, in which:

FIG. 5 shows the conventionally known approximate long-term average spectral energy density for continuous speech, showing that high relative spectral energy is present in near-end speech, which is in the same general range as many alerting and other signaling tones used by customer premises equipment and/or central offices.

DETAILED DESCRIPTION OF ILLUSTRATIVE EMBODIMENTS

The present invention recognizes the performance versus cost limitations of current customer premise equipment (CPE), e.g., equipment capable of operation in a telephone system with combined call-waiting and caller identification (caller ID) services.

The present invention provides apparatus and methods for adaptively, reliably, and accurately measuring the frequency of an alerting or other signaling tone. An embodiment of a tone detector is described which is capable of measuring the frequency of a tone (continuous or pulsed) with a high degree of accuracy (e.g., to within 1 part in 10,000).

The present invention relates to a tone detector capable of high accuracy frequency measurement of an alerting or other signaling tone received over a telephone line. Conventional tone detectors require high order filters or a large, cumbersome Discrete Fourier Transform (DFT) algorithm to accurately measure the frequency of a tone signal. Most conventional tone detectors detect the presence of a minimal amount of energy in a general frequency range about a particular frequency, but require a high order filter or large DFT to measure the exact frequency of a detected tone with any degree of accuracy.

In the present invention, two lower order DFTs and a ratio module provide a measured frequency which is interpolated with a relatively high degree of accuracy. The two DFTs may be low order, and are set to measure the energy level of two "nearby" frequencies close to the frequency of interest, one higher and one lower than the frequency of interest.

The ratio module receives the relative energy levels from the two DFTs and determines a simple linear ratio of the two relative energy levels. Given the known center frequencies of the two DFTs, the ratio provided by the ratio module is used to provide an accurately interpolated measurement of the frequency of the detected tone.

Figure 1:
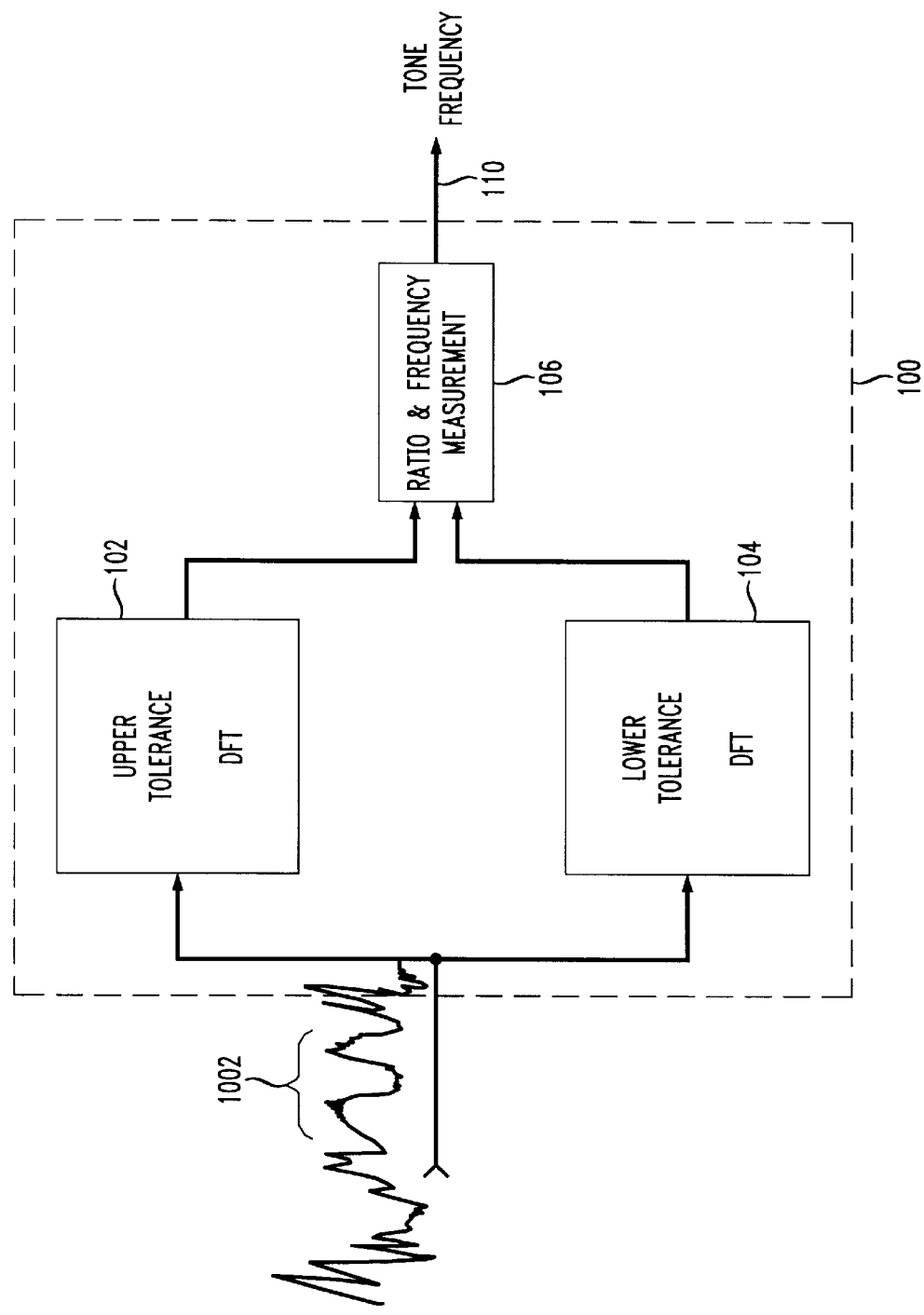
FIG. 1 shows a general block diagram of a tone detector including upper and lower tolerance bandpass filters and a ratio measurement module, collectively capable of accurate measurement of the frequency of a particular alerting or other signaling tone contained in an input signal even in the presence of speech or other signals, constructed in accordance with a first aspect of the present invention.

For instance, FIG. 1 shows a general block diagram of an exemplary tone detector 100 including an upper tolerance DFT 102 and a lower tolerance DFT 104, together with a ratio measurement module 106, collectively capable of accurately measuring the actual frequency of an alerting or other signaling tone contained in an input signal. The tone detector 100 is robust, even in the presence of speech or other distracting or distorting signals.

In particular, FIG. 1 shows a tone detector 100 including an upper tolerance DFT 102 and a lower tolerance DFT 104. Both the upper tolerance DFT 102 and the lower tolerance DFT 104 each receive the input signal including (or not including) a tone to be detected and frequency measured.

The upper tolerance DFT 102 and lower tolerance DFT 104 each perform a discrete Fourier transform on each input frame of data. In the disclosed embodiment, the discrete Fourier transform implements a Goertzel Algorithm using appropriate hardware and/or software to perform a discrete Fourier transformation of the composite input signal, typically including voice signals. The resulting transformation signal comprises information relating to a plurality of frequency-domain bins (called "Goertzels" in the present description).

Rather than a fast Fourier transform as in typical conventional tone detectors, the present invention uses a Goertzel Algorithm to perform a discrete Fourier transform on a particular frequency bin in an input signal, e.g., on a signal from a telephone line. Goertzel Algorithms are described in many references, including, for example, Alan V. Oppenhelm and Ronald W. Schafer, (Englewood Cliffs, N.J.: Prentice-Hall, 1989), 585–87.

Figure 3:
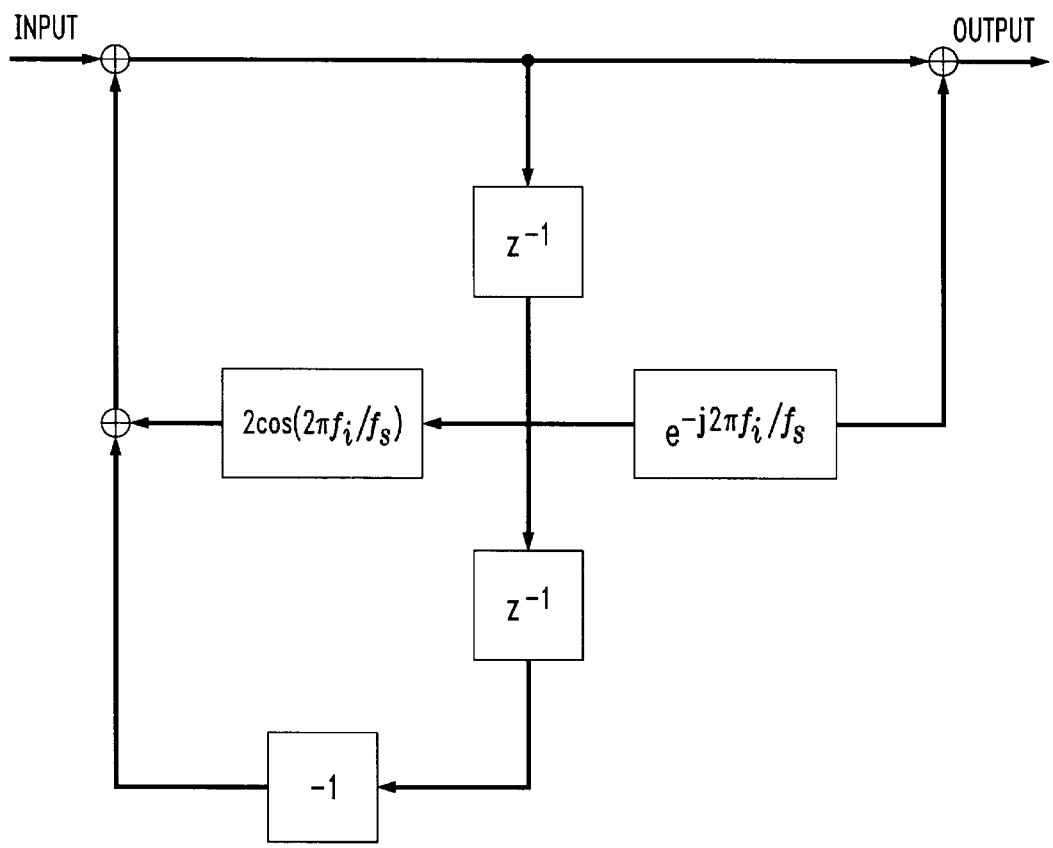
FIG. 3 shows an exemplary second order recursive infinite impulse response filter suitable for implementing a Goertzel algorithm for detection of tones, in accordance with the principles of the present invention.
Figure 4:
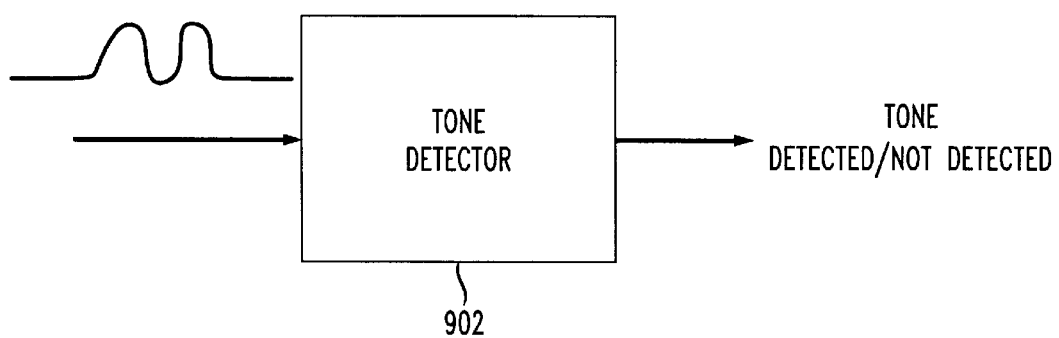
FIG. 4 shows a conventional tone detector which detects the presence of a particular tone frequency in an input signal, e.g., a particular alerting or other signaling tone, and output either a "tone detected" or a "tone not detected" signal with respect to an expected tone.

The Goertzel Algorithm is defined by the following equation:

$$H_{fi}(Z) = \frac{1 - e^{-(2j\pi f_i/f_s)}}{1 - 2\cos(2\pi f_i/f_s)Z^{-1} + Z^{-2}}$$

where $f_i$ is the frequency of interest and $f_s$ is the sampling frequency. Those skilled in the art of digital signal processing will recognize that a second order recursive infinite impulse response filter, such as the one in FIG. 3, can be used for discrete Fourier transformation of signals with the Goertzel Algorithm.

The outputs of the upper tolerance DFT 102 and the lower tolerance DFT 104 are respectively input to a ratio and frequency measurement module 106, which outputs an accurate measurement of the frequency of the detected tone based on the energy detected by each of the upper and lower tolerance DFTs 102, 104.

The measured energy level output from the upper tolerance DFT 102 is compared to the measured energy level output from the lower tolerance DFT 104 to provide a simple ratio there between. Given the simple ratio, and the center frequencies $f_l$, $f_u$ of the lower and upper tolerance DFT 104, 102, a precise interpolation of the actual frequency of the detected tone can be provided by a simple multiplication with the determined ratio. Alternatively, instead of a frequency measurement, the ratio can be used to validate or confirm that a detected tone is within a desired design tolerance, e.g., within 1% of the expected frequency.

The ratio and frequency measurement module 106 may be implemented in software, and/or may be included in the same or different processor as is one or both of the upper and lower tolerance DFTs 102, 104.

Figure 2:
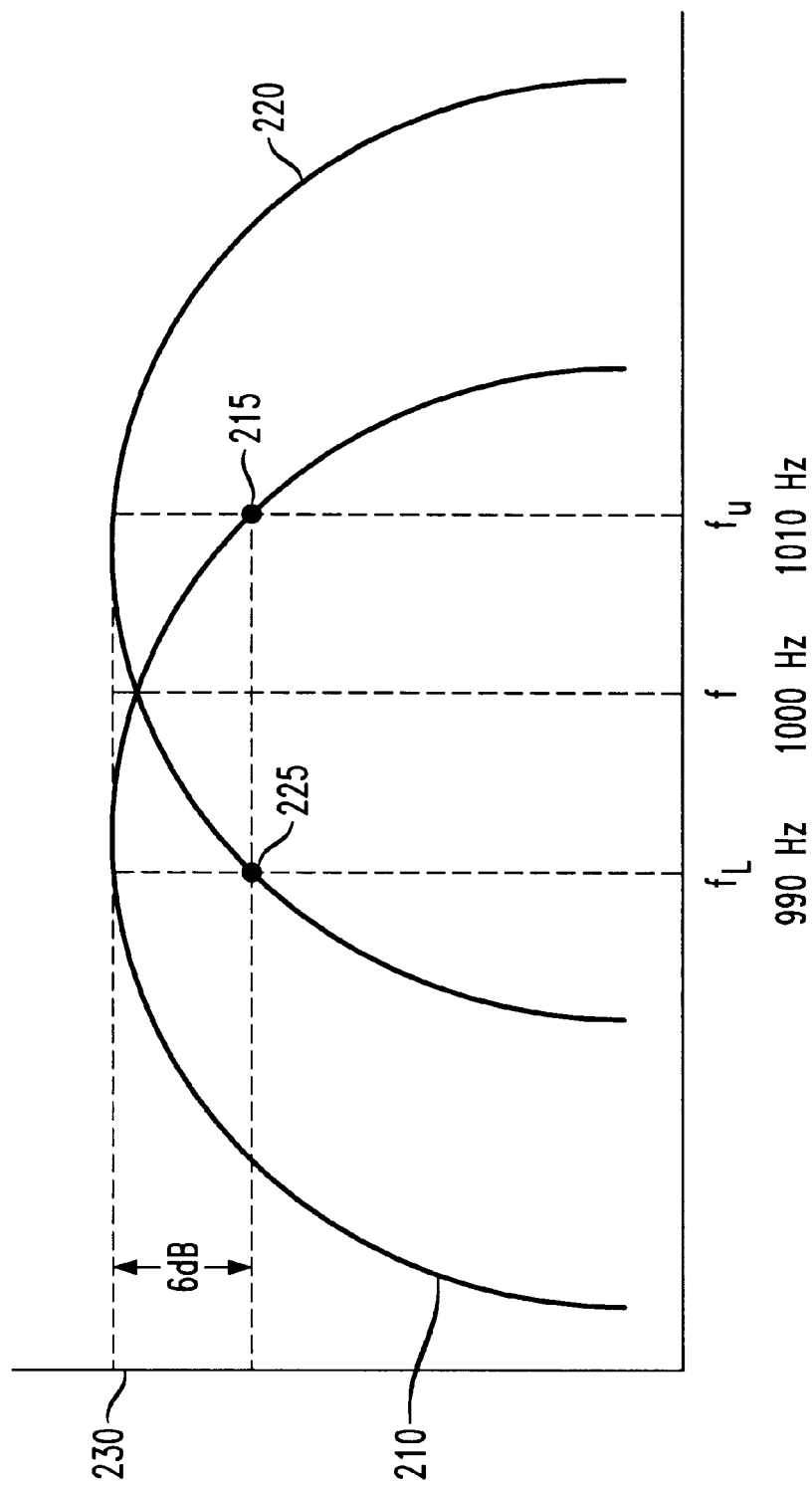
FIG. 2 shows exemplary bandpass specifications of upper and lower tolerance bandpass filters in the embodiment of the present invention shown in FIG. 1.

FIG. 2 shows exemplary bandpass specifications of upper and lower tolerance DFTs 102, 104 in the embodiment shown in FIG. 1. Of course, the invention relates equally to upper and lower tolerance DFTs having significantly different specifications and/or orders from the examples shown in FIG. 2.

In particular, FIG. 2 depicts the approximate range (and low order nature) of the upper tolerance DFT 102 (FIG. 1) detecting the energy in an upper frequency region 220, and of the lower tolerance DFT 104 (FIG. 1) detecting the energy in a lower frequency region 210. As shown in the example of FIG. 2, the upper frequency region 220 has a center $f_u$ a predetermined tolerance value above the center of the frequency of interest f, and the lower frequency region 210 has a center $f_l$ a predetermined tolerance value below the center of the frequency of interest f.

In a given example, a tone to be detected (i.e., the frequency of interest f) may be, e.g., 1000 hertz (Hz), and the desired tolerance or accuracy of the measurement of the tone may be, e.g., 1%. In such a case, the lower tolerance DFT 104 is preferably designed to detect the energy at a frequency no greater than 1% lower than the frequency of interest f, or 990 Hz, and the upper tolerance DFT 102 is preferably designed to detect the energy at a frequency no greater than 1% higher than the frequency of interest f, or 1010 Hz.

Preferably, the upper frequency region 220 and the lower frequency region 210 will intersect, but at respective points down at least, e.g., 6 decibels (dB) before intersecting one another. For instance, as shown in FIG. 2, the upper frequency region 220 intersects the center frequency $f_l$ of the lower frequency region 210 at a point 225 which is at least, e.g., 6 dB down from the peak level 230 of the lower frequency region 210. Similarly, the lower frequency region 210 intersects the center frequency $f_u$ of the upper frequency region 220 at a point 215 at least, e.g., 6 dB down from the peak level 230 of the upper frequency region 220. Thus, ideally, there will be good separation (e.g., greater than 6 dB) at the intersection of the upper and lower tolerance DFTs 102, 104 with minimum separation at the frequency of interest, e.g., 1000 Hz in the given example.

A tone detector constructed in accordance with the principles of the present invention may be capable of measuring the frequency of a detected tone with high accuracy, e.g., to within 1 part in 10,000 or better. Moreover, while the use of high order DFTs is possible within the principles of the present invention, costs and complexity can be significantly reduced by implementing relatively low order filters or small DFTs as the upper and lower tolerance DFTs 102, 104. Accurate and precise frequency measurement improves the distinction in valid tones from underlying speech, and thus provides for a more robust tone detector.

In the disclosed embodiment, a data frame is approximately 4 milliseconds in length, although shorter or longer data frames are also within the principles of the present invention.

Thus, an improved and novel tone detector using digital signal processing has been described. Certainly, variations and modifications of the present invention are possible, given the above description. However, all variations and modifications which are obvious to those skilled in the art to which the present invention pertains are considered to be within the scope of the protection granted by this Letters Patent.

For example, the high accuracy provided by the tone detector of the present invention is not limited to the detection of CAS tones, nor to the detection of Caller ID information, nor even to the exclusive use in telephonic equipment at all.

Tone detectors constructed in accordance with the principles of the present invention may be integrated within the software of a controller or other suitable processor of customer premises equipment (or central office equipment), or may be separate therefrom. The tone detectors can be implemented in standard general purpose processors with relatively low resources. Suitable processors include, e.g., a microprocessor, microcontroller, or digital signal processor (DSP).

Tone detectors in accordance with the principles of the present invention have application in many customer premises equipment and/or central office telephone equipment, including but not limited to telephone answering devices, speakerphones, CallerID or similar call related information receiver/detector units, and/or cordless telephones.

While the invention has been described with reference to the exemplary embodiments thereof, those skilled in the art will be able to make various modifications to the described embodiments of the invention without departing from the true spirit and scope of the invention.

What is claimed is:

1. Apparatus for measuring a frequency or a tone, comprising:

an upper tolerance discrete Fourier transform having an upper center frequency above a frequency of interest;

a lower tolerance discrete Fourier transform having a lower center frequency below said frequency of interest; and a ratio determination module adapted to determine a ratio between a first measured energy level output from said upper tolerance discrete Fourier transform and a second measured energy level output from said lower tolerance discrete Fourier transform; wherein said ratio determination module interpolates said frequency of said tone by multiplying said ratio by a frequency difference between said upper center frequency and said lower center frequency; and adding a result to said lower center frequency.

2. The apparatus for measuring a frequency of a tone according to claim 1, wherein:

a center frequency of at least one of said upper tolerance discrete Fourier transform and said lower tolerance discrete Fourier transform is based on a desired tolerance in said measurement of a signal including said frequency of interest.

3. The apparatus for measuring a frequency of a tone according to claim 1, wherein:

an upper frequency range of energy measurement relating to said upper tolerance discrete Fourier transform intersects a lower frequency range of energy measurement relating to said lower tolerance discrete Fourier transform at a level at least about 6 decibels down from that at a center of said lower frequency range.

4. The apparatus for measuring a frequency of a tone ccording to claim 3, wherein:

an upper frequency range of energy measurement relating to said upper tolerance discrete Fourier transform intersects a lower frequency range of energy measurement relating to said lower tolerance discrete Fourier transform at a level at least about 6 decibels down from that at a center of said upper frequency range.

5. The apparatus for measuring a frequency of a tone according to claim 1, wherein:

an upper frequency range of energy measurement relating to said upper tolerance discrete Fourier transform intersects a lower frequency range of energy measurement relating to said lower tolerance discrete Fourier transform at a level at least about 6 decibels down from that at a center of said upper frequency range.

6. The apparatus for measuring a frequency of a tone according to claim 1, wherein:

said tone is received over a telephone line.

7. The apparatus for measuring a frequency of a tone according to claim 1, wherein:

said tone is an alerting tone.

8. A method of interpolating an actual frequency of a detected signaling tone, comprising:

determining a ratio between a first measured energy level output from an upper tolerance discrete Fourier transform having an upper center frequency, and a second measured energy level output from a lower tolerance discrete Fourier transform having a lower center frequency lower than said upper center frequency;

interpolating said actual frequency using said upper center frequency, said lower center frequency, and said determined ratio;

multiplying said ratio by a difference between said upper center frequency and said lower center frequency; and adding a result of said multiplication to said lower center frequency.

9. Apparatus for interpolating an actual frequency of a detected signaling tone, comprising:

means for determining a ratio between a first measured energy level output from an upper tolerance discrete Fourier transform having an upper center frequency, and a second measured energy level output from a lower tolerance discrete Fourier transform having a lower center frequency lower than said upper center frequency;

means for interpolating said actual frequency using said upper center frequency, said lower center frequency, and said determined ratio;

means for multiplying said simple ratio by a difference between said upper center frequency and said lower center frequency; and means for adding a result of said multiplication to said lower center frequency.

* * * * *